US006748362B1

(12) United States Patent
Meyer et al.

(10) Patent No.: US 6,748,362 B1
(45) Date of Patent: Jun. 8, 2004

(54) PROCESS, SYSTEM, AND APPARATUS FOR EMBEDDING DATA IN COMPRESSED AUDIO, IMAGE VIDEO AND OTHER MEDIA FILES AND THE LIKE

(76) Inventors: Thomas W. Meyer, P.O.Box 230345, Encinitas, CA (US) 92023-0345; Josslyn Motha Meyer, P.O.Box 230345, Encinitas, CA (US) 92023-0345

( * ) Notice: Subject to any disclaimer, the term of this patent is extended or adjusted under 35 U.S.C. 154(b) by 0 days.

(21) Appl. No.: 09/389,941

(22) Filed: Sep. 3, 1999

(51) Int. Cl.[7] ............................ H04L 5/00; H03M 13/11
(52) U.S. Cl. ........................ 704/500; 382/251; 713/179
(58) Field of Search ................................ 704/500, 501, 704/503, 504; 382/232, 233, 248, 250, 251; 713/176, 179

(56) References Cited

U.S. PATENT DOCUMENTS

| | | | | |
|---|---|---|---|---|
| 5,778,102 A | * | 7/1998 | Sandford, II et al. | 382/251 |
| 5,889,868 A | * | 3/1999 | Moskowitz et al. | 713/176 |
| 5,960,081 A | * | 9/1999 | Vynne et al. | 713/176 |
| 6,031,914 A | * | 2/2000 | Tewfik et al. | 380/54 |
| 6,233,347 B1 | * | 5/2001 | Chen et al. | 382/100 |
| 6,266,817 B1 | * | 7/2001 | Chaddha | 725/146 |
| 6,275,599 B1 | * | 8/2001 | Adler et al. | 382/100 |
| 6,285,774 B1 | * | 9/2001 | Schumann et al. | 382/100 |
| 6,314,192 B1 | * | 11/2001 | Chen et al. | 382/100 |
| 6,332,030 B1 | * | 12/2001 | Manjunath et al. | 382/100 |
| 6,345,100 B1 | * | 2/2002 | Levine | 380/205 |
| 6,354,630 B1 | * | 3/2002 | Zhang et al. | 283/70 |
| 6,363,209 B2 | * | 3/2002 | Sako et al. | 386/94 |

OTHER PUBLICATIONS

Qi et al., "Lesion Detection and Characterization in Digital Mammography by Bezier Histograms," Proceedings of the 20th Annual International Conference of the IEEE Engineering in Medicine and Biology Society, vol. 20, No. 2, 1998, pp. 1021 to 1024.*

Lee and Won, "A Watermarking Sequence Using Parities of Error Control Coding For Image Authentication and Correction," IEEE Transactions on Consumer Electronics, vol. 46, No. 2, May 2000, pp. 313 to 317.*

Lee and Chen, "High capacity image steganographic model," IEE Proceedings—Vision, Image and Signal Processing, vol. 147, No. 3, Jun. 2000, pp. 288 to 294.*

Wu et al., "Image Refining Technique Using Digital Watermarking," IEEE Transactions on Consumer Electronics, vol. 46, No. 1, Feb. 2000, pp. 1 to 5.*

Cedric et al., Data concealment in audio using a nonlinear frequency distribution of PRBS coded data and frequency–domain LSB insertion, TENCON 2000. Proceedings. vol. 1, Sep. 2000, pp. 275 to 278.*

Mukherjee et al., "A source and channel coding approach to data hiding with application to hiding speech in video," 1998 International Conference on Image Processing, Oct. 1998, vol. 1, pp. 348 to 352.*

Swanson et al., "Robust data hiding for images," 1996 IEEE Digital Signal Processing Workshop Proceedings, Sep. 1996, pp. 37 to 40.*

* cited by examiner

*Primary Examiner*—Richemond Dorvil
*Assistant Examiner*—Martin Lerner
(74) *Attorney, Agent, or Firm*—Rines and Rines (57) ABSTRACT

A novel process and system for enabling the seamless and facile embedding of relatively large quantities of supplemental digital data into pre-prepared digital media files (audio, image, video, 3D, volumetric and multimedia and the like) by compressing such files and encoding them into sets of coefficient representations (preferably frequency-domain coefficient representations) of the pre-prepared media file information, and embedding bits of the supplemental digital data at selected coefficients, preferably, though not exclusively, using the least significant bit of the selected coefficients, and with stenographic encoding processes.

39 Claims, 10 Drawing Sheets

Data Encoding System Overview

FIG. 1

Data Encoding Playback Overview

FIG. 2

Data Encoding Using Steganographic Techniques

FIG. 3

Using Watermarking with Encoding

FIG. 4

Original Signal

Compressed, Co-efficient Based Representation of Signal (In this case using a Fourier-Based Representation)

| Frequency | Amplitude | Phase |
|---|---|---|
| 1000 | 12 | 10 |
| 1200 | 15 | 6 |
| 1450 | 5 | 12 |
| 1600 | 3 | 1 |

Coefficient-Domain Parity Encoding

FIG. 5

Encoding Data in an Audio File

FIG. 6

Encoding Data in an Image File

FIG. 7

Encoding Data in a Video File

FIG. 8

Encoding Data in a 2D or 3D Spline

FIG. 9

Encoding Data in a Volumetric Data File

FIG. 10

PROCESS, SYSTEM, AND APPARATUS FOR EMBEDDING DATA IN COMPRESSED AUDIO, IMAGE VIDEO AND OTHER MEDIA FILES AND THE LIKE

FIELD OF INVENTION

The general field of application of the invention involves improved techniques for the encoding of digital information into audio, image, and video media files, volumetric data files, 2-D and 3-D spline and other data files and the like, the invention being more particularly, though not exclusively, directed to enabling large sequences of data, as distinguished from relatively short sequences, as in encoding simple copyright or ownership or related limited information into such media files, to be embedded seamlessly and flexibly, particularly into compressed audio, image, video, 3-D and other media files and the like, and with the techniques being also useful with other, types of compressed data files and formats, as well.

BACKGROUND

Data has heretofore often been embedded in analog representations of media information and formats. This has been extensively used, for example, in television and radio applications as for the transmission of supplemental data, such as text, but the techniques used are not generally capable of transmitting high bit rates of digital data.

Watermarking data has also been embedded so as to be robust to degradation and manipulation of the media. Typical watermarking techniques rely on gross characteristics of the signal being preserved through common types of transformations applied to a media file. These techniques are again limited to fairly low bit rates. Good bit rates on audio watermarking techniques are, indeed, only around a couple of dozen bits of data encoded per second.

While data has been embedded in the low-bit of the signal-domain of digital media enabling use of high bit rates, such data is either uncompressed, or capable of only relatively low compression rates. Many modern compressed file formats, moreover, do not use such signal-domain representations and are thus unsuited to the use of this technique. Additionally, this technique tends to introduce audible noise when used to encode data in sound files.

Among prior patents illustrative of such and related techniques and uses are U.S. Pat. No. 4,379,947 (dealing with the transmitting of data simultaneously with audio), U.S. Pat. No. 5,185,800 (using bit allocation for transformed digital audio broadcasting signals with adaptive quantization based on psychoauditive criteria ), U.S. Pat. No. 5,687,236 (steganographic techniques), U.S. Pat. No. 5,710,834 (code signals conveyed through graphic images), U.S. Pat. No. 5,832,119 (controlling systems by control signals embedded in empirical data); U.S. Pat. No. 5,850,481 (embedded documents, but not for arbitrary data or computer code), U.S. Pat. No. 5,889,868 (digital watermarks in digital data), and U.S. Pat. No. 5,893,067 (echo data hiding in audio signals).

Prior publications relating to such techniques include
Bender, W. D. Gruhl, M. Morimoto, and A. Lu, "Techniques for data hiding", *IBM Systems Journal, Vol.* 35, Nos. 3 & 4, 1996, p. 313–336;
MPEG Spec-ISO/IEC 11172, part 1–3, *Information Technology-Coding of moving pictures and associated audio for digital storage media at up to about* 1.5 Mbit/s Copyright 1993, ISO/IEC; and A survey of techniques for multimedia data labeling, and particularly for copyright labeling using watermark in the encoding low bit-rate information is presented by Langelaar, G. C. et al. in "Copy Protection For Multimedia Data based on Labeling Techniques".

In specific connection with the above-cited "MPEG Spec" and "ID3v2 Spec" reference applications, we have disclosed in co-pending U.S. patent application Ser. No. 09/389,942, filed Sep. 3, 1999, entitled "Process Of And System For Seamlessly Embedding Executable Program Code Into Media File Formats Such As MP3 And The Like For Execution By Digital Media Player And Viewing Systems", techniques applying some of the embedding concepts of the present invention, though directed specifically to imbuing one or more of pre-prepared audio, video, still image, 3-D or other generally uncompressed media formats with an extended capability to supplement their pre-pared presentations with added graphic interactive and/or e-commerce content presentations at the digital media playback apparatus.

As earlier indicated, however, the present invention is more broadly concerned with data embedding in compressed formats, and with encoding a frequency representation of the data, typically through a Fourier Transform, Discrete Cosine Transform, wavelet transform or other well-known function. The invention embeds high-rate data in compressed digital representations of the media, including through modifying the low-bits of the coefficients of the frequency representation of the compressed data, thereby enabling additional benefits of fast encoding and decoding, because the coefficients of the compressed media can be directly transformed without a lengthy additional decompression/compression process. The technique of the present invention also can be used in combination with watermarking, but with the watermark applied before the data encoding process.

The earlier cited Langelaar et al publication, in turn, references and discusses the following additional prior art publications:
J. Zhao, E. Koch: "Embedding Robust Labels into Images for Copyright Protection", Proceedings of the International Congress on Intellectual Property Rights for Specialized Information, Knowledge and New Technologies, Vienna, Austria, August 1995;
E. Koch, J. Zhao: "Towards Robust and Hidden Image Copyright Labeling", Proceedings IEEE Workshop on Nonlinear Signal and Image Processing, Neos Marmaras, June, 1995. and
F. M. Boland, J. J. K O Ruanaidh, C, Dautzenberg: "Watermarking Digital Images for Copyright Protection", Proceedings of the 5th International Conference on Image Processing and its Applications, No. 410, Endinburgh, July, 1995

An additional article by Langelaar also discloses earlier labeling of MPEG compressed video formats:
G. C Langelaar, R. L. Lagendijk, J. Biemond: "Real-time Labeling Methods for MPEG Compressed Video," 18*th* *Symposium on Information Theory in the Benelux*, May 15–16, 1997, Veldhoven, The Netherlands.

These Zhao and Koch, Boland et al and Langelaar et al disclosures, while teaching encoding technique approaches having partial similitude to components of the techniques employed by the present invention, as will now be more fully explained, are not, however, either anticipatory of, or actually adapted for solving the total problems with the desired advantages that are addressed and sought by the present invention.

Considering, first, the approach of Zhao and Koch, above-referenced, they embed a signal in an image by using JPEG-based techniques. ([JPEG] Digital Compression and Coding of Continuous-tone Still Images, Part 1: Requirements and guidelines, ISO/IEC DIS 10918-1). They first encode a signal in the ordering of the size of three coefficients, chosen from the middle frequency range of the coefficients in an 8-by-8 block DCT. They divide nine permutations of the ordering relationship among these three coefficients into three groups: one encoding a '1' bit (HML, MHL, and HHL), one encoding a '0' bit (MLH, LMH, and LLH), and a third group encoding "no data" (HLM, LHM, and MMM). They have also extended this technique to the watermarking of video data. While their technique is robust and resilient to modifications, they cannot, however, encode large quantities of data, since they can only modify blocks where the data is already close to the data being encoded, otherwise, they must modify the coefficients to encode "no data". They must also severely modify the data since they must change large—scale ordering relationships of coefficients. As will later more fully be explained, these are disadvantages overcome by the present invention through its technique of encoding data by changing only a single bit in a coefficient.

As for Boland, Ruanaidh, and Dautzenberg, they use a technique of generating the DCT Walsh Transform, or Wavelet Transform of an image, and then adding one to a selected coefficient to encode a "1" bit, or subtracting one from a selected coefficient to encode a "0" bit. This technique, although at first blush somewhat superficially similar in one aspect of one component of the present invention, has the very significant limitation, obviated by the present invention, that information can only be extracted by comparing the encoded image with the original image. This means that a watermarked and a non-watermarked copy of any media file must be sent simultaneously for the watermarking to work. This is a rather severe limitation, overcome in the present invention by the novel incorporation of the use of the least-significant bit encoding technique.

Such least-significant bit encoding broadly has, however, been earlier proposed, but not as implemented in the present invention. The Langelaar, Langendijk, and Biemond publication, for example, teaches a technique which encodes data in MPEG video streams by modifying the least significant bit of a variable-length code (VLC) representing DCT coefficients. Langelaar et al's encoding keeps the length of the file constant by allowing the replacement of only those VLC values which can be replaced by another value of the same length and which have a magnitude difference of one. The encoding simply traverses the file and modifies all suitable VLC values. Drawbacks of their techniques, however, are that suitable VLC values are relatively rare (167 per second in a 1.4 Mbit/sec video file, thus allowing only 167 bits to be encoded in 1.4 million bits of information).

In comparison, the technique of the present invention as applied for video, removes such limitation and can achieve much higher bit-rates while keeping file-length constant, by allowing a group or set of nearby coefficients to be modified together. This also allows for much higher quantities of information to be stored without perceptual impact because it allows for psycho-perceptual models to determine the choice of coefficients to be modified.

The improved techniques of the present invention, indeed, unlike the prior art, allow for the encoding of digital information into an audio, image, or video file at rates several orders of magnitude higher than those previously described in the literature (order of 300 bits per second ). As will later be disclosed, the present invention, indeed, has easily embedded a 3000 bit/second data stream in a 128,000 bit/second audio file.

In the prior art, only relatively short sequences of data have been embedded into the media file, typically encoding simple copyright or ownership information. Our techniques allow for media files to contain entirely new classes of content, such as: entire computer programs, multimedia annotations, or lengthy supplemental communications. As described in said copending application, computer programs embedded in media files allow for expanded integrated transactional media of all kinds, including merchandising, interactive content, interactive and traditional advertising, polls, e-commerce solicitations such as CD or concert ticket purchases, and fully reactive content such as games and interactive music videos which react to the user's mouse motions and are synced to the beat of the music. This enables point of purchase sales integrated with the music on such software and hardware platforms as the television, portable devices like the Sony Walkman, the Nintendo Game Boy, and portable MP3 players such as the Rio and Nomad and the like. This invention even creates new business models. For example, instead of a record company trying to stop the copying of its songs, it might instead encourage the free and open distribution of the music, so that the embedded advertising and e-commerce messages are spread to the largest possible audience of potential customers.

OBJECTS OF INVENTION

It is accordingly a primary object of the present invention to provide a new and improved process, system and apparatus for embedding data in compressed audio, image, video and other media files and the like that shall not be subject to the limitations and disadvantages of the prior art as above discussed, but that, to the contrary, seamlessly and facilely enables large sequences of data to be embedded into such compressed data media files, enabling adding new classes of content including, but by no means limited to, entire computer programs, multi-media annotations and lengthy supplemental communications, among other supplemental contents.

A further object is to provide such a novel process in which digital watermarking may also be used, but with the watermark applied before the data encoding process.

Still another object is to provide such a novel embedding technique that is more generally and generically applicable, as well, including for volumetric data files, 2-D and 3-D spline datapoint files, and other data files.

Other and further objects will be explained hereinafter and are more particularly pointed out in the appended claims.

SUMMARY

In summary, therefore, from one of its broader aspects, the invention embraces a process for embedding supplemental digital data into a pre-prepared compressed digital media file, that comprises, encoding the compressed digital media file as a set of coefficient representations of the pre-prepared media file information, and embedding portions of the supplemental digital data at selected coefficients to produce a media file containing such embedded data for enabling user decoding and playback of both the pre-prepared media file information and the embedded supplemental data.

Preferred and best mode embodiments, designs and techniques are later presented in detail.

DRAWINGS

The invention will now be described in connection with the accompanying drawings, FIG. 1 of which is a block and flow diagram illustrating an overview of the data encoding process and system, operating in accordance with a preferred embodiment of the invention.

DESCRIPTION OF PREFERRED EMBODIMENTS OF THE INVENTION

As before discussed, an important application of the process and system of the invention is for the adding of supplementary relatively large quantities of data to pre-prepared media files that have been compressed by frequency-domain transformation, providing a set of coefficients which approximate or represent the source media. Such large quantities of supplemental digital data are embedded into the files seamlessly and facilely. This is done, moreover, in such a manner as to enable such supplemental data to be extracted by digital media playback apparatus, while preserving backwards compatibility with existing media players.

Suitable compressed media formats are those which compress a media file by transforming it from the signal domain into a set of function coefficients, for example, the Fourier, Sine, Cosine or Wavelet transformations and their variations. In such compressed media formats, the set of coefficients, as before stated, approximate the source media though having a smaller representation than the original data file.

Examples of suitable compressed media formats with which the invention may operate include, but are not limited to, the MP3, MP2, MPEG, and JPEG formats described in the before-cited references. The compressed media may also have additional embedded data such as digital watermarks.

Data that may be embedded into the compressed media include, but are not limited to text files, database files, executable program code (such as Java files, Macromedia Director, Shockwave or Flash, Perl, VRML, TCL, Visual Basic, machine code, or byte codes), image files, audio files, 3-D files, or any archive format such as cab, jar, or zip or the like.

Types of playback apparatus for presenting both the original pre-prepared media file content and the supplemental embedded data content include any computer system capable of playing or viewing a media file. Specific examples of players include, but are not limited to, portable music players, Personal Digital Assistants (PDAs), WebTV, digital televisions, car stereos, home audio systems, video walls, and console and portable game devices and the like.

Underlying the implementation of the invention generally, as more fully explained hereinafter in connection with the various systems and applications illustrated in the drawings, are novel techniques for encoding the bits of the digital data signal by means of small modifications to the coefficients. Because the pre-prepared data files are stored and transmitted in digital form, the small modifications remain intact. When used to encode high bit-rate information, however, these techniques may not always be robust to modifications of the data file, and the data may be corrupted. Robustness may be improved by repetition of the data and by careful choice of the coefficients to be modified, but in many of the intended applications of the techniques of the invention, robustness is a lower priority than the encoding of maximal information without excessive degradation of the user's playback experience of the compressed media.

Figure 1:
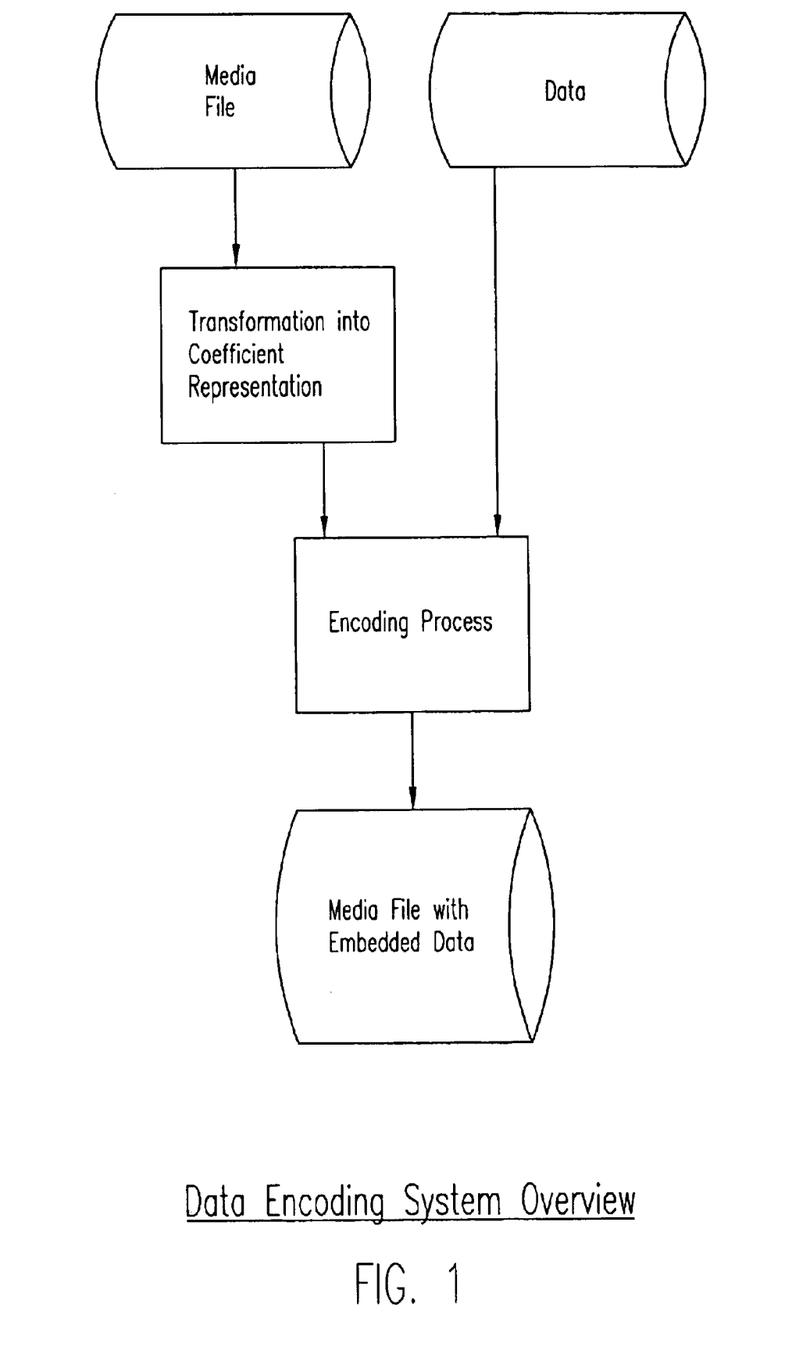
Figure 5:
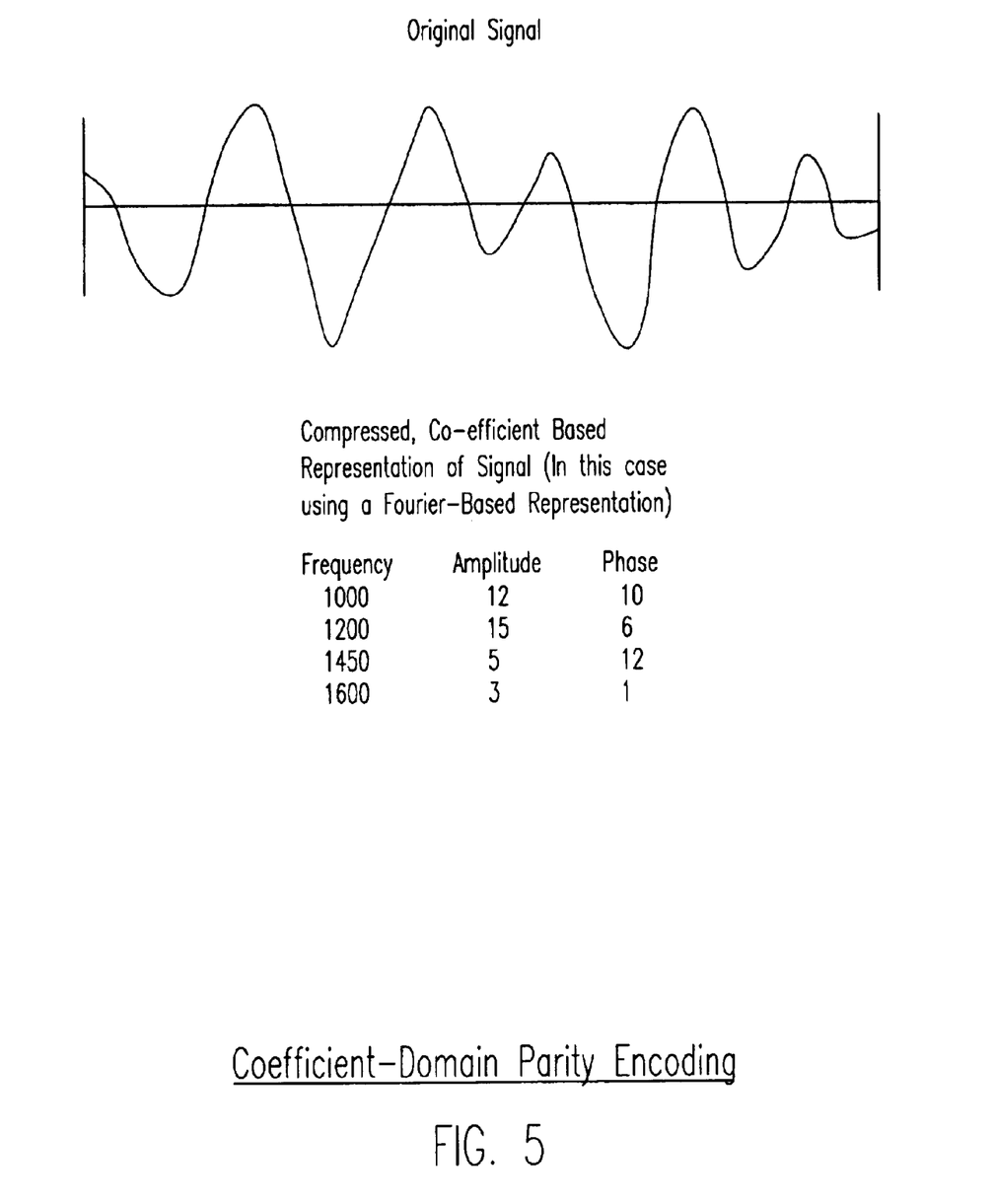
FIG. 5 is an exemplary signal waveform and Fourier transformation-based compressed coefficient-based representation of the signal for use in the coefficient-domain parity encoding process useful with the invention.

Referring now to FIG. 1, a media file such as, for example, the previously discussed audio, image, video, 3-D or other multimedia data or the like, is shown encoded by frequency transformation, so-labeled, in a coefficient representation of the media data using a Fourier, Cosine, Sine, Wavelet or related discrete transform representation as earlier described, and as illustratively shown in the signal waveform and coefficient-based tabular illustration of FIG. 5. The transformation into coefficient representation results in a compressed media file content format. If the pre-prepared media file has earlier been encoded into a coefficient representation, this further transformation step will, of course, not be required. A further compressor step may, however, also be used.

The thusly compressed media file content is diagrammatically shown combined in an encoding process of any well-known type, later more fully discussed, with the supplemental data content ("Data") for embedding into the media file, such additional data being any digital data, as earlier stated, including, but not limited to, audio, video, image, database, text, executable code, or application-specific data and the like. There then results, a media file with supplemental embedded data without affecting its backwards compatibility with existing file formats, and without substantially affecting the user's playback experience of the media file. If desired, moreover, the transformation step of FIG. 1 may be made part of the encoding process, and may even include an optional compression step, or these may be applied as additional separate steps. In the event that such transformation, compression and encoding processes are combined, indeed, it is then possible to use perceptual encoding techniques to choose into which coefficients to embed the data.

Continuing with broad overview, the decoding and playback are diagrammed in FIG. 2, wherein the decoding process, so-labeled and later more fully discussed, is dependent upon the type of encoding process used in FIG. 1 to embed the supplemental data into the media file. Typically, such involves a simple reversal of the encoding process, as is well-known. The media file, as shown, is usually left unchanged in the decoding process because not only is it often not feasible to remove the data, but to do so would not typically improve the user's playback experience at the media player or viewer, shown in FIG. 2 in the playback environment. The supplemental data, however, may be verified ("Verification Process") by well-known checksum or digital signature to insure that the data is bit-wise identical to the data which was originally encoded and embedded in FIG. 1.

Figure 2:
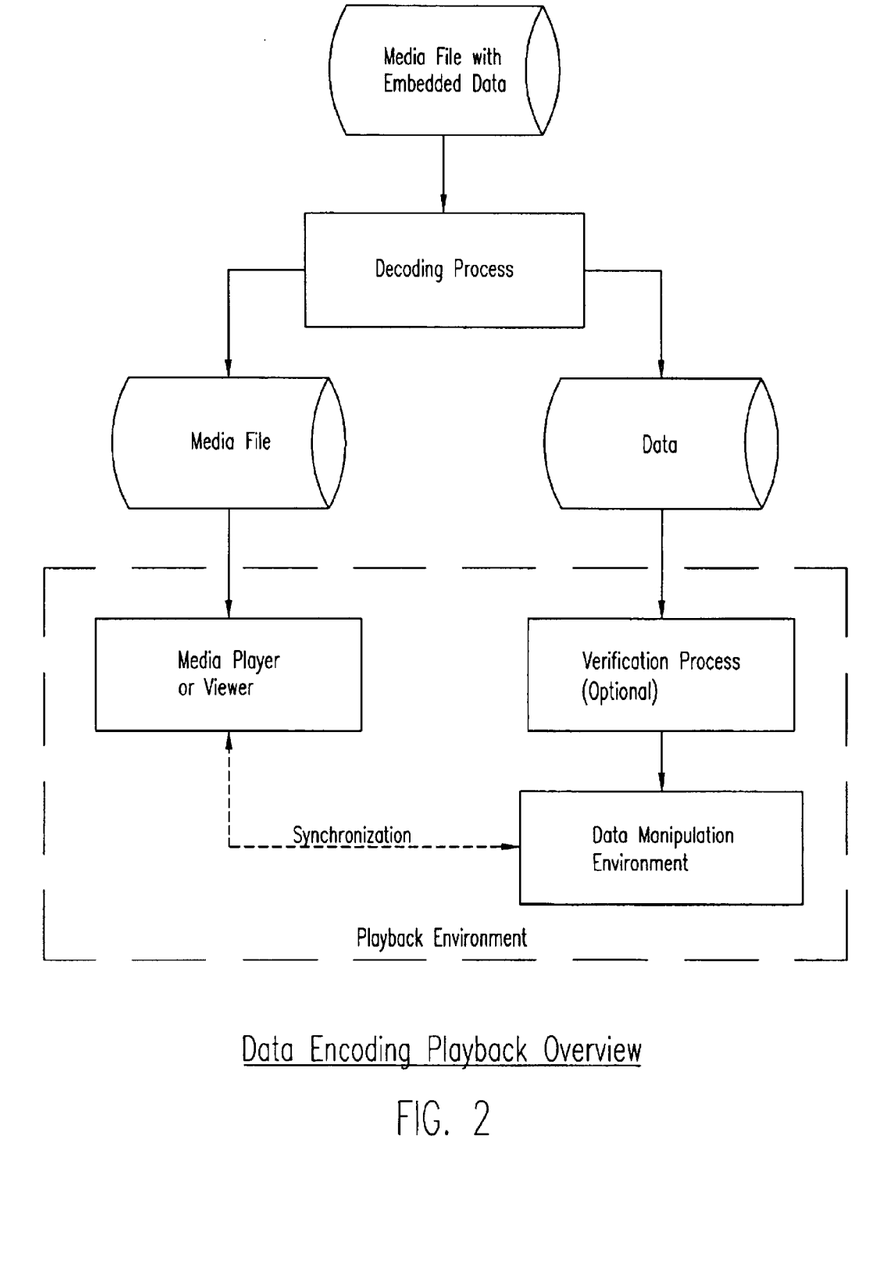
FIG. 2 is a similar diagram presenting an overview of the decoding of the media file embedded with the data of FIG. 1, as playback by the media player or viewer.

In the playback environment, moreover, the media player and the execution environment may communicate with one another, illustrated schematically in FIG. 2 by the SYNC line between the player and the data manipulation environment boxes, so that the execution of the supplemental data can be synchronized with the playback of the media file content.

Figure 3:
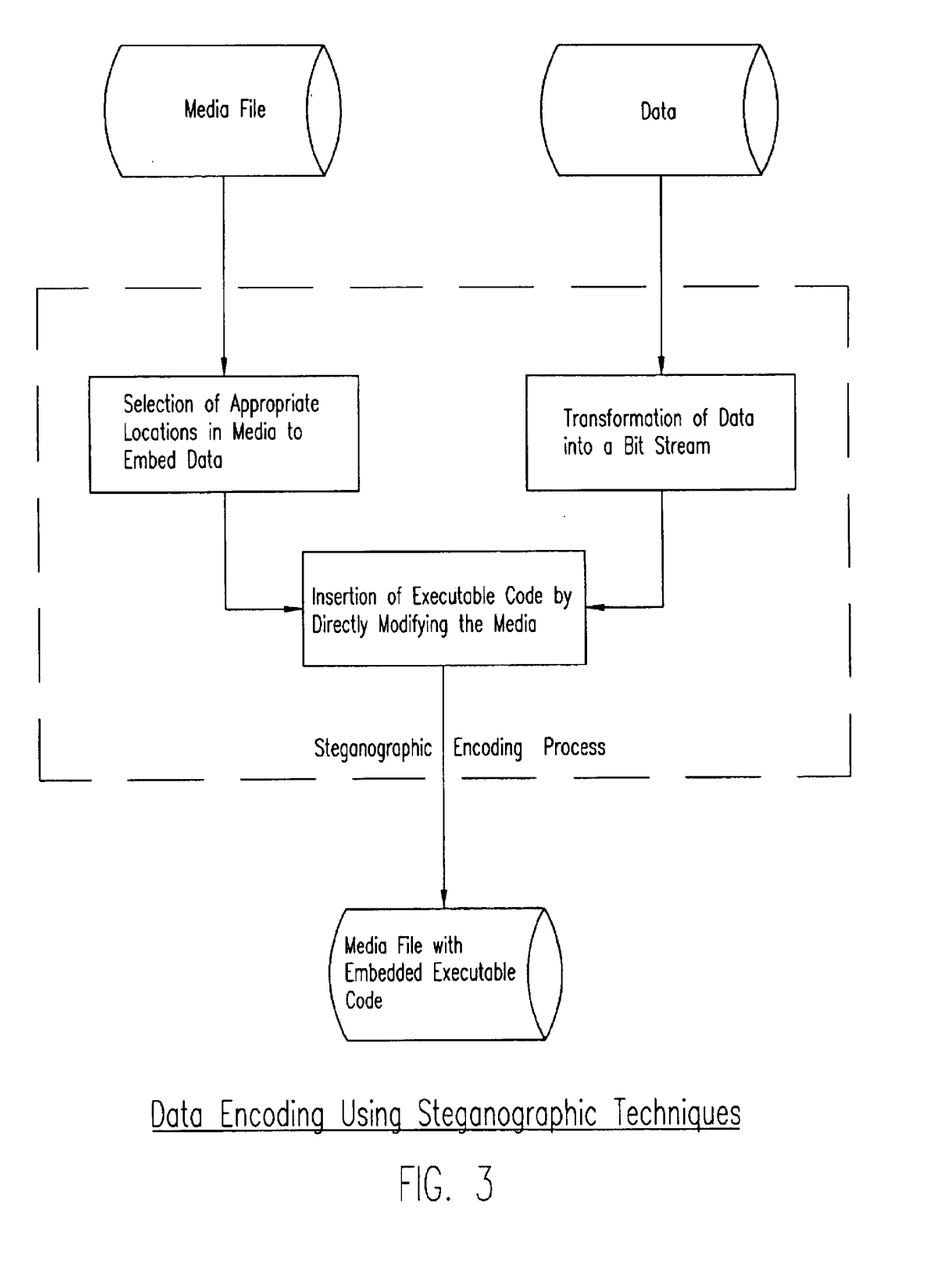
FIG. 3 is a view similar to FIG. 1 showing the use of the previously (and later) discussed steganographic techniques in the encoding process.

The possible use of data encoding using steganographic techniques was earlier mentioned with reference citations, and such an application to the techniques of the present invention is illustrated in FIG. 3. The supplemental data to be embedded is there shown transformed into a bit stream code, with the bytes of the data extracted into a bit-by-bit representation so that they can be inserted as small changes into the media file. The selection of the appropriate locations in the media file content into which to embed the data bits, as labeled, is based on the identification of minor changes that can be made to the actual media content with minimal effects to the user's playback experience of the file. Such changes, however, must be such that they can easily be detected by an automated decoding process, and the information recovered.

At the step of "Insertion of Executable Code" in FIG. 3, any one of a number of steganographic encoding processes (including those of the earlier cited references) may be used. In accordance with the present invention, where the media content is represented as a set of function coefficients, the data bits are preferably embedded by the technique of modifying the least-significant bit of some selected coefficients, as hereinafter also more fully discussed.

Figure 4:
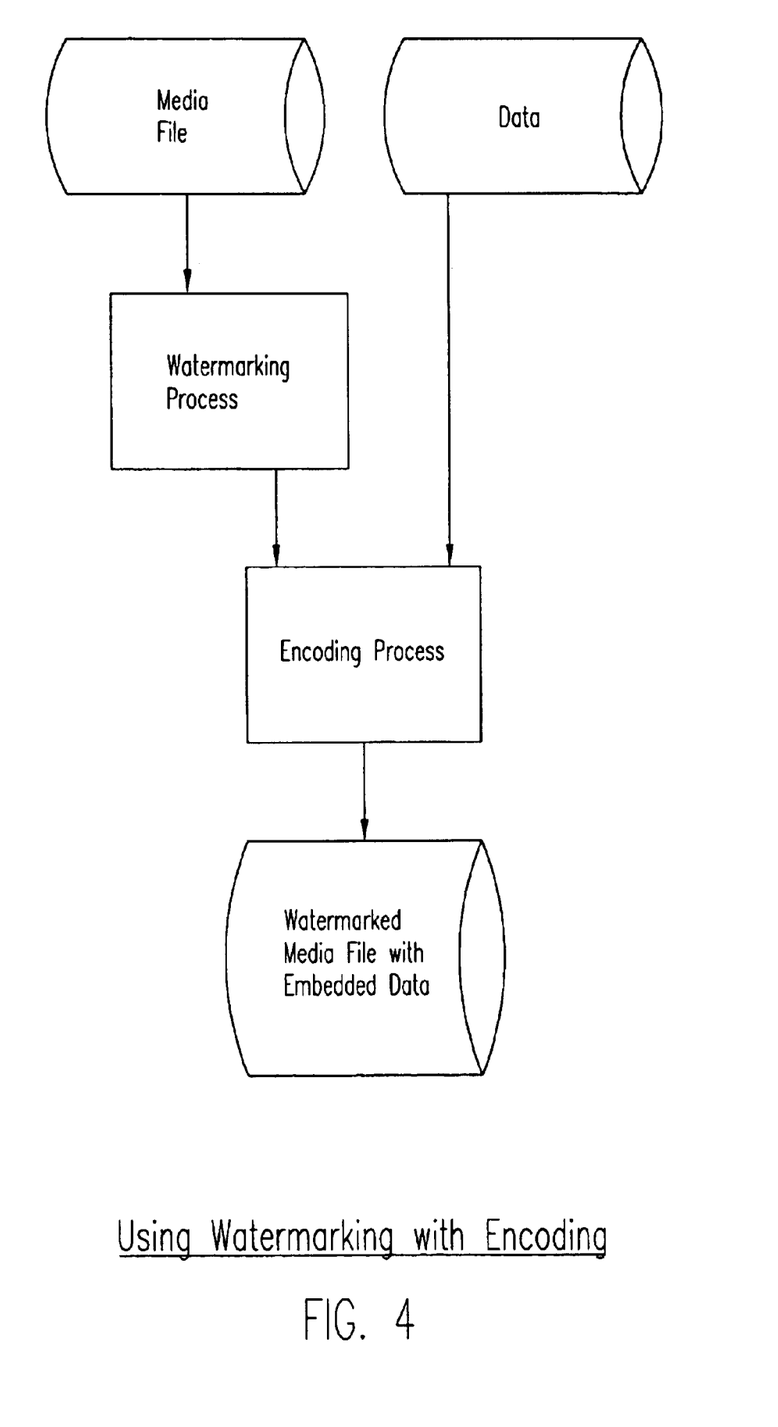
FIG. 4 illustrates the use of the before-mentioned digital watermarking processes with the encoding process of the invention.

The resulting media file with embedded executable code is again backwards compatible, with, in some cases, slightly diminished, but entirely acceptable, possible user playback experience due to the embedding process.

Where the use of digital watermarking with the encoding techniques of the invention is desired, the system of FIG. 4 may be employed, with the media file watermarking process effected prior to the data embedding by the encoding process, as labeled. There are many different types of digital watermarking processes that can be employed, including those of the earlier cited references. Most watermarks are robust and are thus not easily removed by modifications of the media file, and so are not affected by the later "Encoding Process" to embed the data as shown in FIG. 4. The data embedding is done after the watermarking, however, since some data embedding techniques are not robust to modifications of the media file. A watermark media file with embedded data thus results wherein the file has a robust watermark and contains the supplemental data embedded therein.

Traditional watermarking techniques are only capable of embedding data at relatively low bit rates, for example, about 22 binary digits (bits) of data per second of audio. In accordance with this invention, more than 3000 bits of data per second has been readily embedded in an MP3 audio file encoded at a bit-rate of 128,000 bits/sec.

We have, indeed, performed successful preliminary tests of several of these various encoding techniques of the invention. Using an exemplary audio file taken from the song "Jealousy" by Natalie Merchant, we encoded as an (MPEG) MP3 at 128 kbits/sec, using Fraunhofer's MP3enc encoder. The encoded portion of the file is 30 seconds long, and is 720 kilobytes in size. The primary encoding technique chosen was the Phase/Magnitude Frequency-Domain Low-Bit Coding Technique, while varying the interval at which data was encoded in the file.

The successful results are as shown below:

| Files | Embedding Interval | Data Rate Achieved | Affected Sound Quality |
|---|---|---|---|
| Original CD | none | none | original |
| MP3 | none | none | slight compression artifacts |
| MP3 w/Data | 1 bit/16 coefficients | 2800 kbits/sec | close to original MP3 |
|  | 1 bit/8 coefficients | 5600 kbits/sec |  |
|  | 1 bit/4 coefficients | 11200 kbits/sec | some artifacts |

Figure 6:
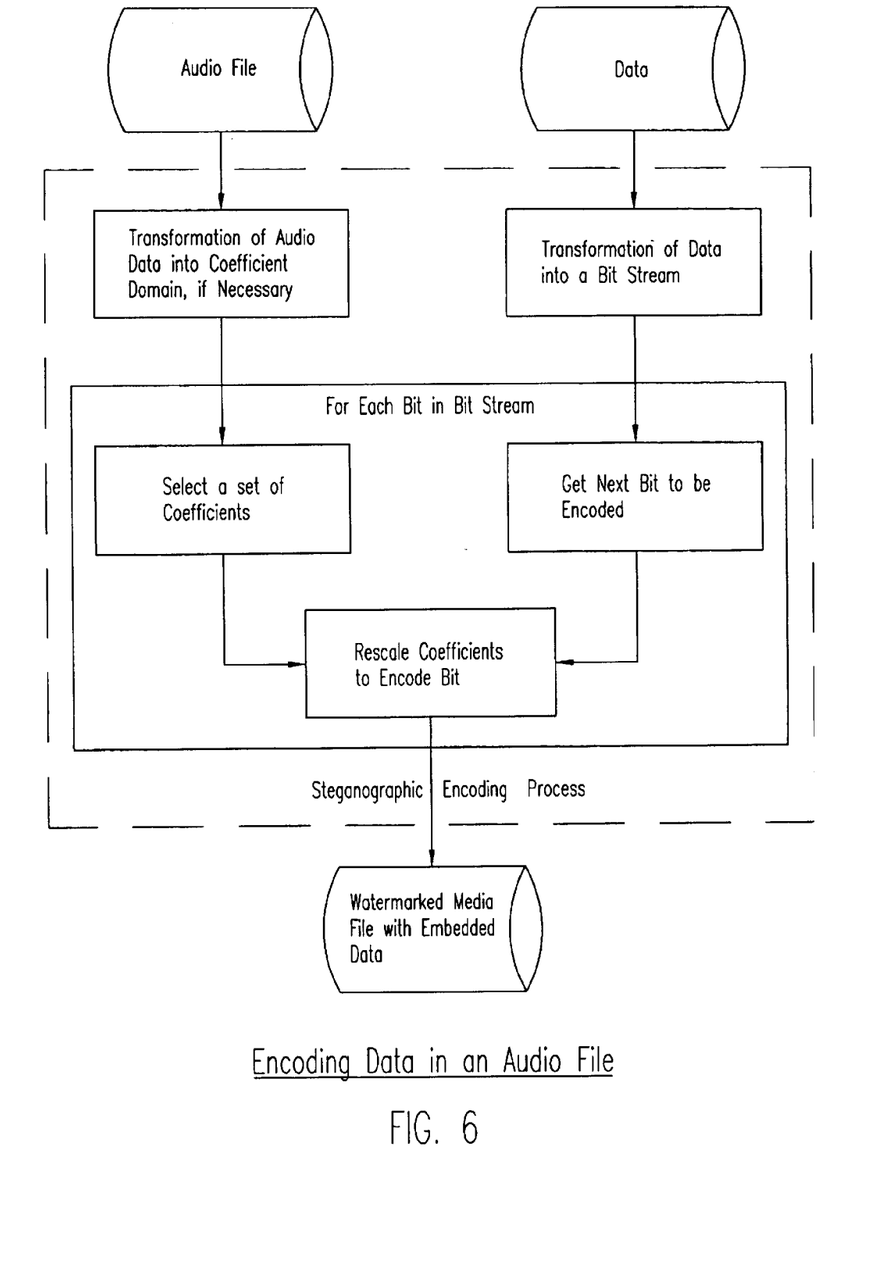
FIG. 6 is a more detailed block and flow diagram specifically directed to a steganographic encoding of audio data, compressed through transformation into a coefficient domain and embedded with data and digitally watermarked in accordance with the process of the invention.

Further in connection with audio media file applications, reference is now made to the audio file data and coding system of FIG. 6.

As in the general scheme of FIG. 1, the pre-prepared audio file of FIG. 6 is shown compressed by the before-discussed transformation into a coefficient domain, providing that it has not already been encoded in the coefficient domain. This step is, however, unnecessary if the audio file is already in such a format, such as with the MPEG audio content in the test above-reported, which is encoded in the DCT domain. As in the steganographic technique system of FIG. 3, earlier described, the supplemental data to be embedded in the audio file is shown transformed into a bit stream.

It is now in order to select the sets of suitable coefficients of the audio file transform, preferably at regular intervals, for implementing the data bit embedding in accordance with the present invention. As earlier pointed out, the invention need change only a single bit in a selected coefficient, as distinguished from prior art large—scale ordering changes in the relationships of the coefficients (for example, as in the previously cited Zhao and Koch references). This set can be selected by simply choosing a consecutive series of coefficients in the audio file. A preferred technique is to choose a set of coefficients which encode a wide range of frequencies in the audio data (FIG. 5).

For each bit in the data bit stream, FIG. 6, the selected coefficient and the next data bit to be encoded are combined, re-scaling the coefficients to encode the bit ("Rescale"). If possible, this is preferably done in conjunction with the quantizing and re-scaling step so that the choice of the coefficient to be modified can be based on the closeness of the original coefficient to the desired value. After quantizing and re-scaling, furthermore, there is not as much data on which to base this decision.

The re-scaling, moreover, can be done in-place in an already-encoded audio file, with the added constraint of keeping the file size constant. In such a case, where it is not possible to encode the bit just by re-scaling a single coefficient while maintaining the frame rate, multiple coefficients may be changed so that their compressed representation remains of the same length and the audio file is accordingly minimally disturbed.

This encoding may be accomplished through an LSB encoding process, or preferably through the LSB parity encoding (FIG. 5). Such parity encoding allows more choice regarding the coefficients to be modified.

Referring to the illustrative coefficient-based representation of the table in FIG. 5, the parity of the coefficients can be computed by adding them together:

$$12+15+5+3+10+6+12+1=64.$$

Since 64 is even, the bit value currently encoded in these co-efficients is 0. If, however, it is desired to encode a 1 in this set of coefficients, it is only necessary to make the parity odd. This can be done by choosing any amplitude or phase value, and either adding or subtracting 1. This choice of value can be done arbitrarily, or can be made based on the types of psycho-acoustic models currently used in the before-discussed MPEG encoding process.

This illustrates the use of parity of the low bits of a series of coefficients in the encoding of the data by magnitude frequency-domain low-bit coding. As an example, assume it is desired to encode a single bit of data information in a series of, say, eight coefficients. In accordance with the invention, instead of simply modifying the low bit of the first coefficient, encoding is effected by modifying the parity of the eight low bits together. The algorithm examines a set of consecutive coefficients, extracts the low bits, and counts how many of them are set. Thus, with the technique of the invention, a single bit of data can be encoded in, whether the number of set bits is even or odd (the parity). This provides the advantage of providing algorithmic choice in determining which coefficient to modify, if any.

Alternatively, this technique may be applied to a wider range of values, while using higher-order parity. As an example, the same amount of data can be encoded over 32 coefficients as can be encoded over two 8-coefficient regions, by adding up the low bits of those 32 coefficients and then computing the result modulo four (the remainder when dividing by four). This provides more flexibility in choosing which coefficients to modify, though it does not allow as much data to be inserted into the stream.

While having earlier stated in connection with, for example, the overview embodiment of FIG. 1, that well-known types of encoding processes, including those of references cited herein, may be used in the implementation of the invention, a preferred encoding process for MPEG layer III audio files (MP3) above-discussed will now be detailed for such an MPEG audio stream. In the following description, the notation $xx is used to refer to a hexadecimal-encoded octet, e.g., $00 represents the binary digits 00000000. This frame are the ISO-8859-1 (ASCII) characters "EXEC". This is followed by a four-octet Size header and a two-octet Flags header, as described in the ID3v2 specification. This is followed by $00, to represent the use of ISO-8859-1 text encoding within the frame, or by $01, to represent the use of ISO/IEC 10646-1 (Unicode) text encoding, later referenced. A header is first created containing a description of the executable code and how it was embedded. The first octet is an unsigned number representing the number of coefficients which are grouped together to represent a bit. This will most often be 8. This is followed by an eight-octet unsigned number representing the length of the header plus the executable code. Next is the ISO 8859-1 (ASCII) encoded MIME type of the executable content as described in IETF RFC 2045, also later referenced, followed by $00. For example, the MIME type of the before-mentioned Macromedia Flash files is "application/x-shockwave-flash". This is followed by a description of the executable code in ISO-8859-1 (ASCII), terminated by $00. This, in turn, is followed by a single octet, which is $00 if there is no checksum, or $01 if there it is a checksum, as described in connection with FIG. 2. If there is a checksum, this is followed by a single octet of the checksum, created by summing the octets of the executable code together, and taking the result modulo 256. This is useful because this lets the executable code be examined before executing, to reduce the possibility that there have been transmission errors that might cause erroneous instructions to be executed.

This header is placed at the beginning of the executable content. The entire package, of the header plus the content, is then transformed into a bit-stream by examining each octet in turn, and placing its bits into the bit-stream from Most Significant-Bit to Least-Significant-Bit ordering. Now that the bit-stream has been generated, it is necessary to embed it into the MPEG audio file. To do this, any of the techniques described herein may be used. One preferred technique is to use the previously described LSB parity encoding. Here, one may modify the parity of groups of eight coefficients, though any number may be used. This group of eight coefficients is chosen by selecting every seventh coefficient in the data file. In this way, a total of seven bits may be encoded in a set of 56 coefficients, where each group of coefficients contains coefficients that represent a wide range of frequencies. The previously described parity encoding technique may be used to encode a bit in each set of coefficients, until the data is completely embedded. Where the data is too large to fit in the file, one may use the parity of fewer than eight coefficients to represent a bit, though this may reduce the quality of the listening experience. When a number of coefficients other than eight are used, the first bite of the data file is encoded using eight coefficients, and then all succeeding bytes are encoded using the number of coefficients specified in the first byte.

In the preferred embodiment of the invention, as earlier stated in connection with FIG. 2, the decoding process is a simple reversal of the encoding process above-detailed. The first octet is extracted from the audio data, and based on that, all succeeding bits are extracted as well. If there it is a checksum encoded in the header, the octets of the executable code are summed, the result taken modulo 256, and compared with the encoded checksum. If they are equal, then execution proceeds.

Based on the MIME type of the executable code, an appropriate execution environment is instantiated. In the case of the application/x-shockwave-flash type discussed previously, a reference execution environment is described b Macromedia in the Flash Standards web page.

The execution environment is then invoked to begin execution of the executable code simultaneously with the playback of the audio file. Additional Application Programming Interfaces (APIs) may be defined with reference to the execution environment to control the exact behavior of the execution environment relative to the audio file while playback is occurring.

Specific references for fuller details of the above-explained techniques usable in the encoding and decoding process components of the invention, are:

[ISO 8859-1] ISO/IEC DIS 8859-1. 8-bit single-byte coded graphic character sets, Part 1: Latin alphabet No. 1. Technical commmittee/subcommittee JTC 1/SC 2;

[MIME] Freed, N. and N. Borenstein, "Multipurpose Internet Mail Extensions (MIME) Part One: Format of Internet Message Bodies", RFC 2045, November 1996; and

[UNICODE] ISO/IEC 10646-1:1993. Universal Multiple-Octet Coded Character Set (UCS), Part 1: Architecture and Basic Multilingual Plain Technical committee/subcommittee: JTC 1/SC 2.

Continuing with the use of the illustrative MPEG audio and video files of FIG. 6, (and later-discussed video files of FIG. 8), for example, and referring to the earlier cited MPEG and MP3 references, the least-significant bits of the magnitude coefficients of the frequency representation of the file are used to encode the program content (so-called magnitude frequency-domain low-bit coding). Depending on the amount of data needed to be encoded in, for example, a music file, data can be stored in a small percentage of the coefficients; say, by only modifying every tenth coefficients, or by using a pseudo-random repeatable sequence to determine which coefficients to modify. When applied to an MP3 format, which uses an additional step of Huffman encoding to compress the data further, the coefficients may be modified before the Huffman encoding, in which case it will slightly change the file size. Alternatively, and in the preferred embodiment of the invention, the coefficients are modified or re-scaled after the encoding process, as earlier discussed. This avoids increasing the size of the file and also allows the data-extraction process to execute more quickly.

Figure 7:
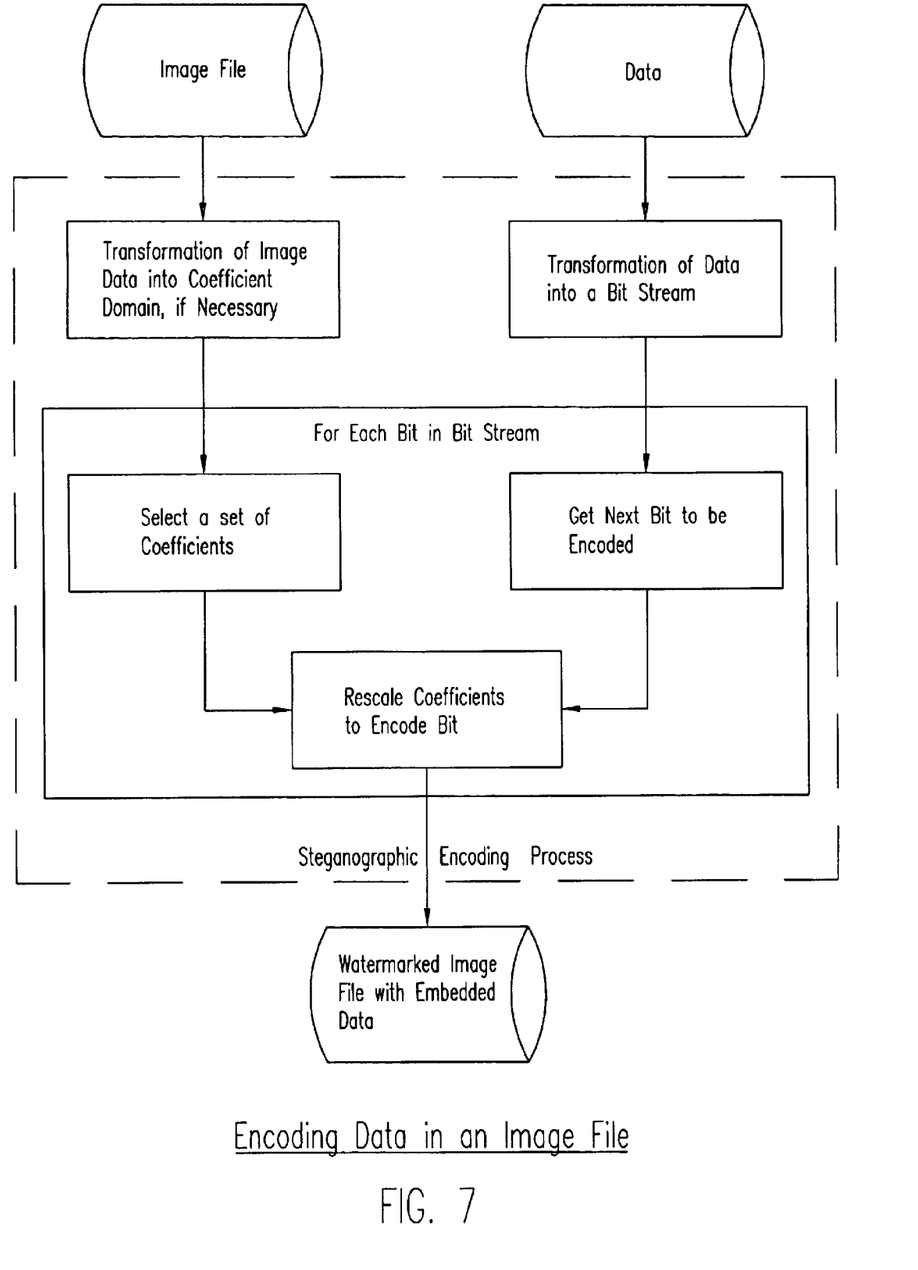
FIGS. 7 and 8 are similar to FIG. 6 but are directed respectively to encoding data in an image and in a video file, again compressed by transformation of the respective image and video data into coefficient domain.

Similarly to the watermarked audio file with embedded data, an image file may be so embedded as shown in FIG. 7. The image file need only be transformed into a coefficient domain, as illustrated, if it has not already been so encoded. If the image file is in a format such as the before-referenced JPEG, which is encoded in the DCT domain, this step is not necessary. Again, the set of coefficients selected, preferably encompasses a wide range of frequencies in the image data. Parity encoding is preferred in the coefficient rescale for data bit encoding, allowing more choice in the coefficients to be modified, as before explained.

Figure 8:
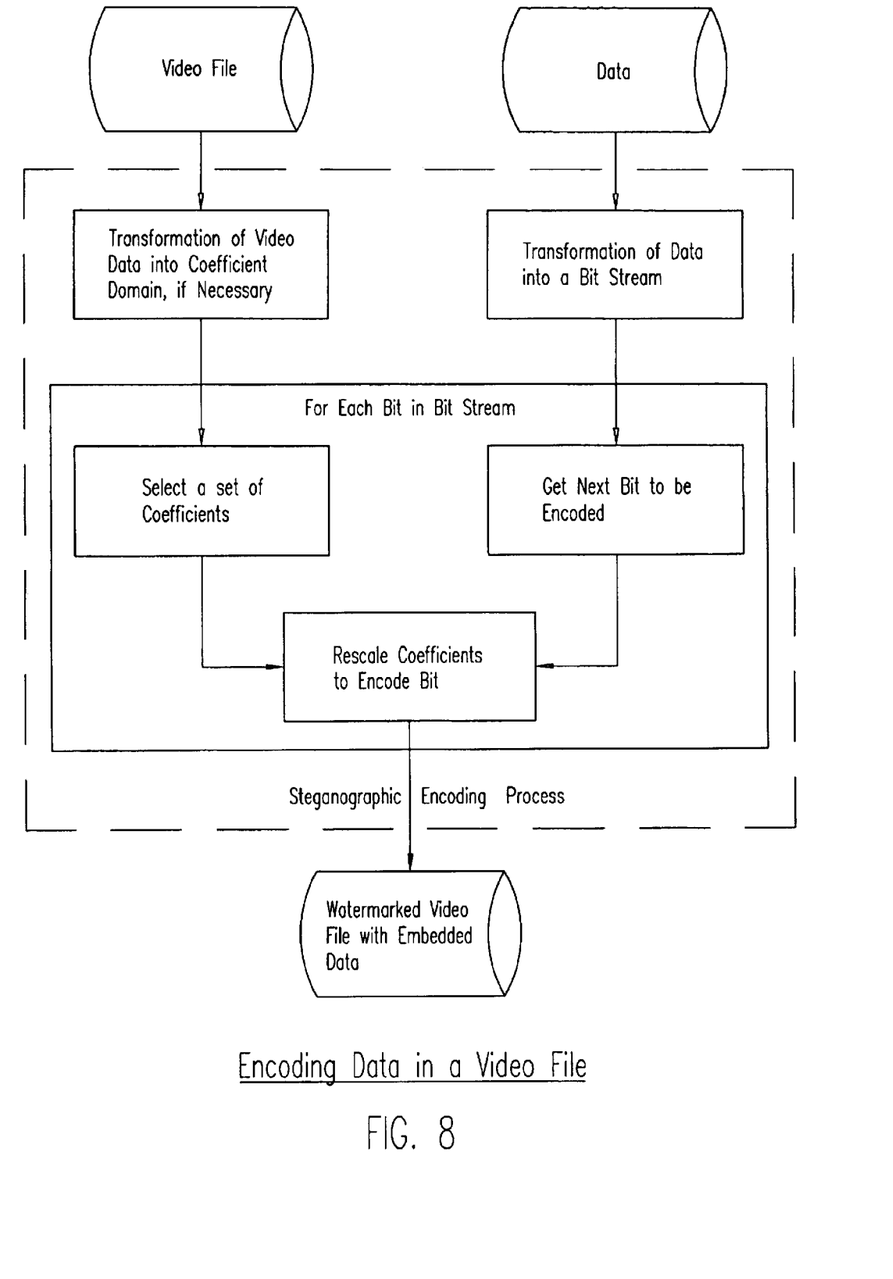

FIG. 8 is similar to FIG. 6, being directed, however, to a transform-compressed video file rather then an audio file.

Figure 9:
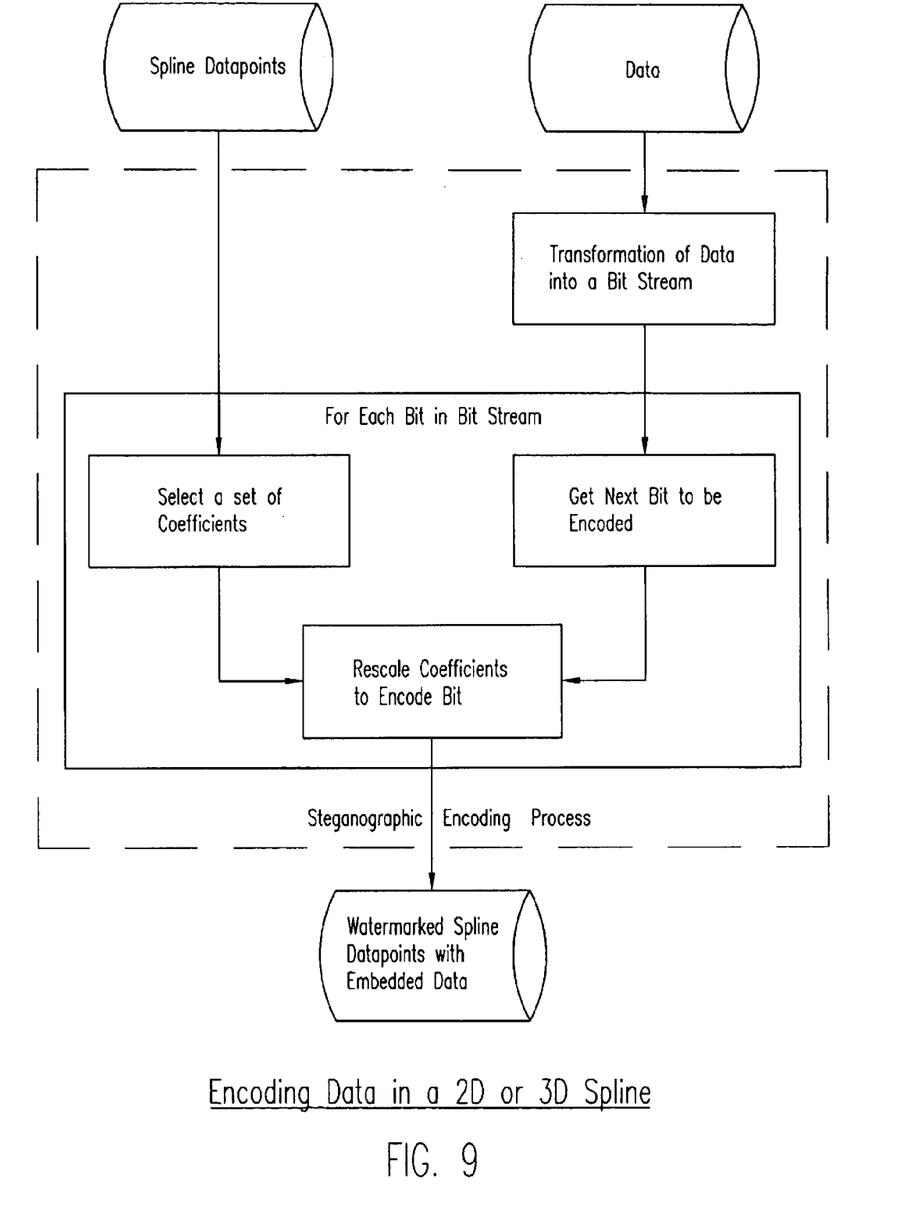
FIG. 9 is a similar diagram applied to the encoding of data in a 2-D or 3-D spline of data points.

The data encoding of FIG. 9 similarly tracks that of FIG. 7, but for 2-D and 3-D spline datapoints such as are used throughout the domain of 3-D modeling. They are already represented using a coefficient representation, encoding coefficients of parametric equations in two and three dimensions. Examples of typical types of such splines include Bezier curves and non-uniform rational B-splines (NURBS). The set of coefficients selected for the data bit stream embedding can be simply a consecutive series of coefficients in the spline datapoints file.

Figure 10:
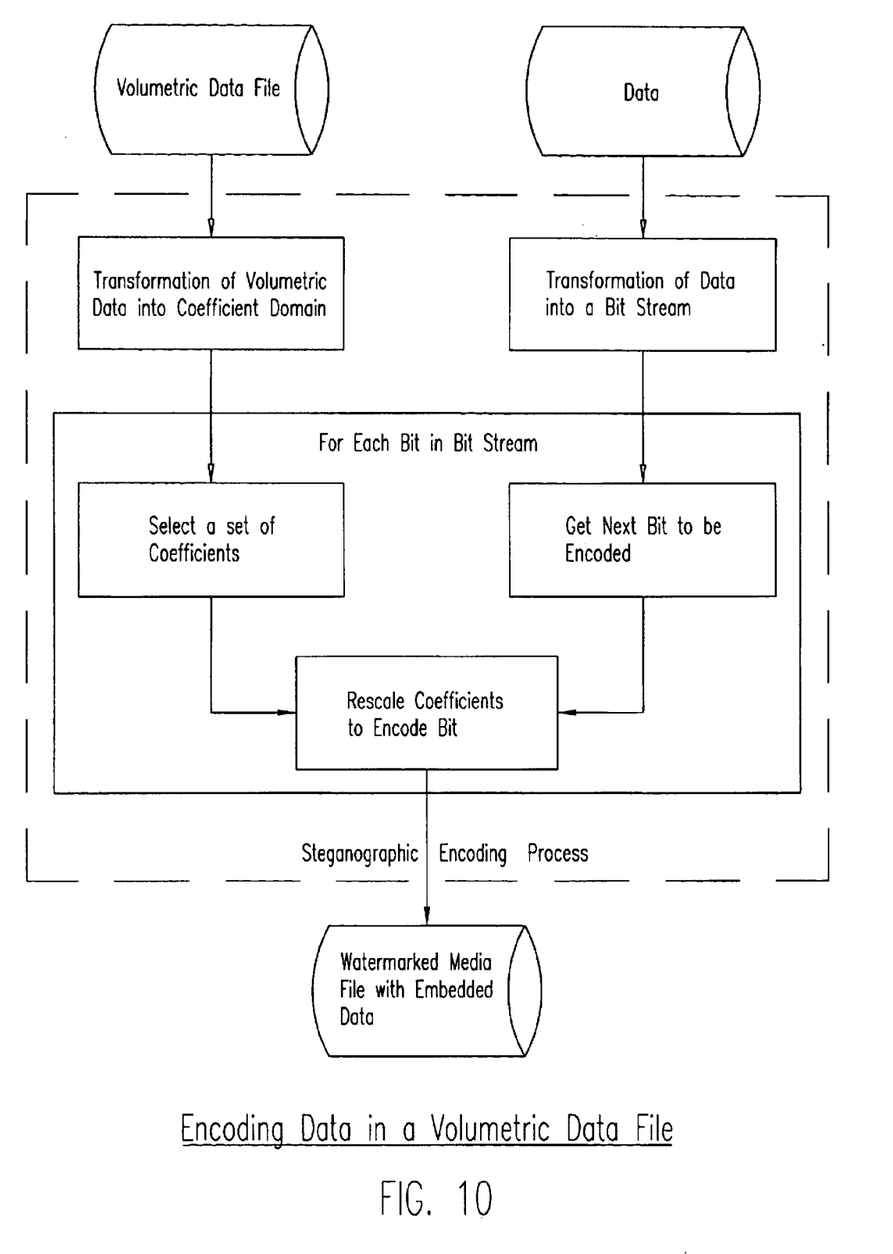
FIG. 10 is directed to the encoding of the data in volumetric data files.

As still a further example of the generic versatility of the invention, FIG. 10 illustrates application of the principles of the invention to encoding supplemental data in volumetric data files. Volumetric data is used to represent spatial data sets using "voxels" —a pixel with a third dimension. Voxels are generally arranged in a 3-D array, and are used by 3-D modeling tools and environments to represent such things as, for example, 3-D spatial models, magnetic resonance imaging (MRI) data, spatial temperature distributions, and the like, etc. Since presently there are no common compression techniques for such volumetric data, transformation into the coefficient domain is required, as shown. This may be done using a well-known 3-D transformation, such as the 3-D DCT or 3-D Fast Fourier Transform.

While the preferred use of least-significant bits of the magnitude or amplitude coefficients of the transform frequency representation of, for example, compressed audio and video files have been discussed, other techniques may also be employed such as phase frequency-domain low-bit coding wherein the least-significant bits of the phase coefficients (FIG. 5) of the transform frequency representation of the media file are used to encode the program. The implementation is the same except for the use of the phase coefficients to encode data as opposed to the magnitude coefficients —and, in the case of audio content, because the human ear is much less sensitive to the phase of sounds than to their loudness, less audible distortion may be encountered in playback.

Further modifications will also occur to those skilled in this art, and such are considered to fall within the spirit and scope of the invention as defined in the appended claims.

What is claimed is:

1. A process for embedding supplemental data selected from the group consisting of interactive and traditional advertising, merchandising materials, e-commerce solicitations and messages, polls, video games, interactive music and audio/video programs, and computer programs, into a pre-prepared digital media file, that comprises, transforming the media file into encoded sets of frequency domain coefficient representations of the pre-prepared media file information and compressing the file; selecting predetermined coefficient sets; and embedding at rates of the order of thousands of bits per second in media files encoded on the order of a hundred kilobits per second and at selected multiple coefficients of each set to produce a supplemental data file containing such embedded data for enabling user decoding and playback of both the pre-prepared media file information and the embedded supplemental data, wherein the embedding steps uses the least-significant bit of the selected coefficients and wherein single bits of data are embedded in each of a number of coefficients of each set and by computing the parity of such least-significant bits of a group of said coefficients.

2. The process of claim 1 wherein the coefficients are prepared by discrete transforms selected from the group consisting of Fourier, Cosine, Sine and Wavelet transforms.

3. The process of claim 1 wherein the embedding step uses the least-significant bit of the selected coefficients.

4. The process of claim 3 wherein the selected coefficients are chosen at regular intervals.

5. The process of claim 3 wherein said coefficients are selected as one of or both frequency and phase coefficients.

6. The process of claim 1 wherein a perceptual encoding technique is used to select which of a group of said coefficients is to be modified by data embedding.

7. The process of claim 6 wherein said parity of the least-significant bits of said group of coefficients embeds a bit of data, while minimizing the effect on said user's perception of the media file playback.

8. The process of claim 1 wherein said playback preserves backwards compatibility of the apparatus used for such playback.

9. The process of 1 wherein steganographic encoding is employed in which the data is transformed into a bit stream and locations are selected in the media file information where the insertion and embedding of supplemental data bits produce minimal effects in the perception of the user during said playback.

10. The process of claim 9 wherein said insertion and embedding is effected at the least-significant bit of selected coefficients.

11. The process of claim 1 wherein digital watermarking is applied to the media file information prior to the embedding of the supplemental data.

12. The process of claim 1 wherein steganographic encoding is employed in which the data is transformed into a bit stream; sets of coefficients are selected to encompass a range of frequencies in the media file information; and, for each bit in the bit stream, the selected coefficients and the next bit to be encoded are combined to rescale the coefficients and encode such bit as embedded.

13. The process of claim 12 wherein the media file information is selected to be at least one of audio, image, video, 2D and 3D spline datapoints, and volumetric data files.

14. The process of claim 13 wherein the media file information is at least one of audio and video information in an MPEG format.

15. The process of claim 13 wherein the media file information is image file information in a JPEG format.

16. The process of claim 13 wherein the spline data is one of Bezier curves and NURBS.

17. The process of claim 13 wherein the volumetric data is compressed by using a 3D transformation.

18. The process of claim 1 wherein the media file contains one of audio, image, video, 2D and 3D splines, volumetric and multimedia information.

19. A system for embedding supplemental digital data selected from the group consisting of interactive and traditional advertising, merchandising materials, e-commerce solicitations and messages, polls, video games, interactive music and audio/video programs, and computer programs, into a pre-pared digital media file having, in combination, encoding means for transforming the media file information into sets of frequency-domain coefficient representations of the pre-prepared media file information and for compressing the file; means for selecting predetermined coefficient sets; and further encoding means for embedding at rates of thousands of bits of said supplemental digital data per second in a media file encoded on the order of a hundred kilobits per second and at selected multiple coefficients of each set to produce a supplemental media file containing such embedded data for enabling user decoding and playback on playback apparatus of both the pre-prepared media file information and said embedded supplemental data, wherein the further encoding means uses the least-significant bit of the selected coefficients, and wherein the further encoding means embeds single bits of data in each of a number of coefficients of each set and by computing the parity of such least-significant bits of a group of said coefficients.

20. The system of claim 19 wherein the media file information is selected from the group consisting of audio, image, video, 2D and 3D splines, volumetric and multimedia information.

21. The system of claim 20 wherein the first-named encoding means prepares said coefficients by one of Fourier, Cosine, Sine and Wavelet transforms.

22. The system of claim 19 wherein, in operation, the further encoding means uses the least-significant bit of the selected coefficients.

23. The system of claim 22 wherein the selected coefficients are chosen at regular intervals.

24. The system of claim 22 wherein said coefficients are selected as one of or both frequency and phase coefficients.

25. The system of claim 19 wherein a perceptual encoding technique is used to select which of a group of said coefficients is to be modified by data embedding.

26. The system of claim 16 wherein the further encoding means responds to said parity of the least-significant bits of said group of coefficients to embed a bit of data, while minimizing the effect on said user's perception of the media file playback.

27. The system of claim 19 wherein said playback preserves backwards compatibility of the playback apparatus.

28. A process for embedding supplemental digital data into a compressed-digital information stream, that comprises, encoding the compressed digital data stream as a set of coefficient representations of said information; and embedding at least thousands of bits/second of said supplemental digital data at data in information streams encoded on the order of a hundred kilobits per second, at selected multiple coefficients of said set to produce a stream containing such embedded data for enabling user decoding to present both said information and the embedded supplemental data.

29. A process for embedding supplemental digital data selected from the group consisting of interactive and traditional advertising, merchandising materials, e-commerce solicitations and messages, polls, video games, interactive music and audio/video programs, into a digital information stream, that comprises, transforming the stream into encoded sets of frequency-domain coefficient representations of said information and compressing the same; selecting predetermined coefficient sets; and embedding thousands of bits/second of the supplemental digital data in information streams encoded on the order of a hundred kilobits per second and at selected multiple coefficients of each set to produce a supplemental data file containing such embedded data for enabling user decoding to present both the said information and the embedded supplemental data.

30. The process of claim 29 wherein the selected coefficients are chosen at substantially regular intervals.

31. The process of claim 29 wherein a bit of said supplemental data is embedded in each of from 4 to 16 coefficients.

32. The process of claim 29 wherein the parity is modified in groups of eights or more coefficients.

33. The process of claim 32 where in the group of eight coefficients, every seventh coefficient is selected in the supplemental data such that seven bits are encoded in a set of 56 coefficients.

34. The process of claim 33 wherein each group of coefficients contains coefficients that represent a wide range of frequencies.

35. The process of claim 29 wherein the encoding is used to encode a bit in each set of coefficients until the supplemental data is completely embedded.

36. The process of claim 29 wherein the first byte of the supplemental data is encoded in a number of coefficients using 8 coefficients, and all succeeding bytes are encoded using the number of coefficients specified in said first byte.

37. A process for embedding supplemental digital data selected from the group consisting of interactive and traditional advertising, merchandising materials, e-commerce solicitations and messages, polls, video games, interactive music and audio/video programs, and computer programs, into a compressed-digital information stream, that comprises, encoding the compressed digital information stream as a set of coefficient representations of the pre-prepared media file information; embedding portions of said supplemental digital data at rates of thousands of bits per second in information streams encoded of the order of a hundred kilobits per second and at selected multiple coefficients of said set to produce a media file containing such embedded data for enabling user decoding and playback of both the pre-prepared media file information and the embedded supplemental data, wherein single bits of data are embedded in each of a number of coefficients of each set and by computing the parity of the least significant bits of a group of said coefficients.

38. The process of claim 37 wherein said computing comprises modifying the parity of groups of a number of coefficients, embedding a bit in each set of coefficients.

39. The process of claim 37 wherein watermarking digital data is also applied to the media file, but prior to the embedding of said supplemental data.

* * * * *